June 1, 1943. C. W. KANDLE 2,320,610
DRILL BIT
Filed Oct. 21, 1940
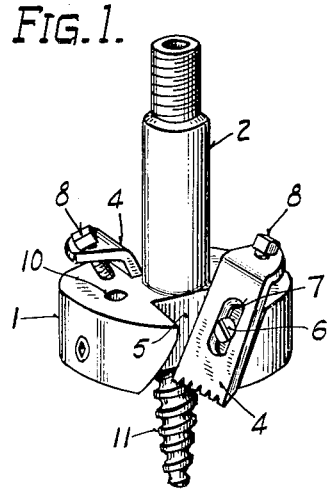
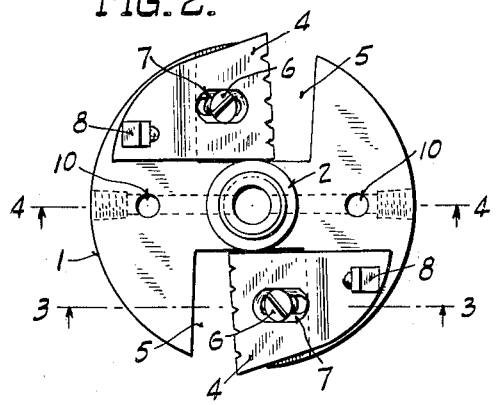
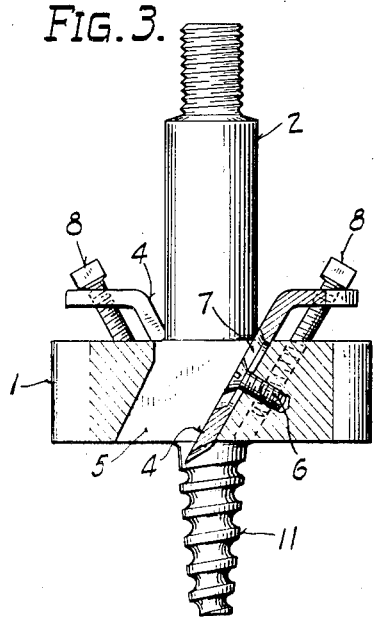
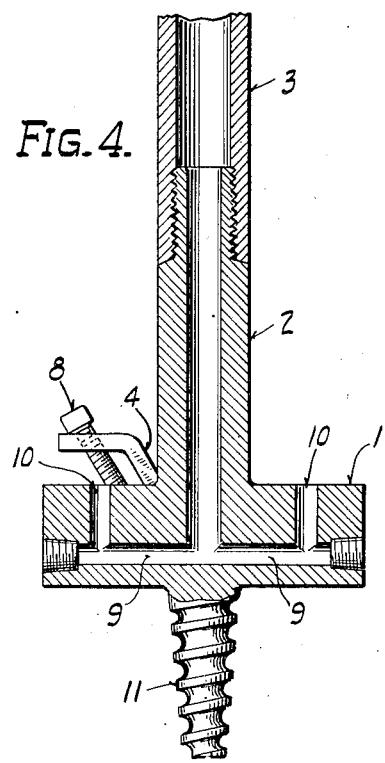
Charles W. Kandle
INVENTOR.
BY
ATTORNEY.

Patented June 1, 1943

2,320,610

UNITED STATES PATENT OFFICE 2,320,610

DRILL BIT

Charles W. Kandle, Chicago, Ill.

Application October 21, 1940, Serial No. 362,020

3 Claims. (Cl. 255—70)

This invention relates to drill bits, principally for earth drilling.

The invention has been applied to the drilling of post holes and horizontal holes beneath paving for pipes and the like.

In the drilling of holes beneath pavements for inserting pipes, without having to dig through the pavement, the invention has proved particularly useful since it makes possible the use of small portable rotary drive units operated by compressed air and utilizing the compressed air for assisting in cleaning out the hole. The drill is particularly useful in drilling through top soil and clay soils.

Heretofore, the drilling of horizontal holes from thirty to one hundred feet long beneath pavements, has not been practiced, since difficulty was encountered in producing a straight hole and in keeping the hole clear as the drilling progressed.

The object of the present invention is to provide a drill bit and connections therefor which will overcome these difficulties and which will quickly and efficiently drill through ordinary soils either in vertical or horizontal directions and produce a substantially straight hole of uniform diameter.

Another object of the invention is to provide a drill bit which is more rugged and less costly than other types of bits.

According to the invention in its principal phase the bit is of disc shape with an outer circumferential edge of substantial thickness and a cutting edge set at an angle in a slot therethrough.

In another phase the bit has one or more ports extending upwardly in the upper surface of the disc and connected by internal passages with the hollow drill stem for the discharge of compressed air to assist in breaking up the spoil and cleaning the hole.

A preferred embodiment of the invention is illustrated in the accompanying drawing in which:

Figure 1 is a perspective view of the drill bit;

Fig. 2 is a top plan view of the bit;

Fig. 3 is a vertical section taken on line 3—3 of Fig. 2, showing the cutting edge; and Fig. 4 is a vertical section taken on line 4—4 of Fig. 2 showing the air passages.

The drill bit illustrated comprises a thick plate of metal 1 of circular contour having a diameter equal to that of the hole to be drilled and having a central threaded shank 2 welded to it and adapted to make threaded coupling with the hollow drill pipe 3.

The substantial thickness of the plate 1 at its edge serves to guide the bit in the hole so as to produce a substantially straight hole, and it is preferable to have the plate of uniform thickness throughout since it is more rugged and rigid for supporting the cutting edge and preventing battering of the outer circumferential guide portion The cutter comprises a pair of blades 4 of substaintial thickness set at an angle to the vertical and in a substantially radial direction with respect to plate 1 with the cutting edge extending below the plate. Each blade 4 is secured in a slot 5 in the plate 1, the width of the slot being greater at the top than at the bottom in order to prevent jamming of the spoil in the slot. The slot 5 and blade 4 are preferably disposed at a slight angle to the radial, in a direction to crowd the spoil outwardly from the center at the cutting edge. This results in a smoother and more compact wall for the hole. In certain types of soils, however, as in light soils, it may be better to have the cutter blade 4 radial to the plate 1 or even at an angle crowding the dirt inward. The cutter blades may be made of any suitable hard wear resisting material.

The two cutter blades are arranged diametrically opposite in plate 1 and serve to balance any side thrust resulting from the angle at which the blades are disposed. It is possible to employ a single blade, or to employ a larger number of blades. Where a larger number is employed, it is well to balance them by equal spacing around the circumference.

The rear edge of the slot 5, or rather, the edge of the plate 1 at the slot, supports the blade at the desired angle, and a screw 6 passes through vertical slot 7 in the blade to allow adjustment of the height of the blade so as to determine the amount of the cut.

The upper end of the blade is bent on a horizontal and a screw 8 is threaded through it and into plate 1, in a direction parallel to the line of movement in the blade during adjustment. When it is desired to move the blade up or down, set screw 8 is removed from plate 1, screw 6 is loosened and the blade moved to the desired position, after which the screw 6 is tightened and screw 8 is threaded into plate 1.

The cutting edge of blade 4 may be smooth, but preferably it has teeth from one eighth to a quarter of an inch apart to assist in breaking up the spoil. The spoil passes upwardly through the slot 5, over the top of blade 4 and then falls onto the top of plate 1. In some instances the spoil is fairly fine and in others it is in coarse lumps.

Where the drilling is downward, the spoil can be lifted out of the hole by raising the bit at intervals and fine spoil can be blown out of the hole. For the latter purpose the drill stem 3 is hollow and connects at the bottom with passages 9 extending radially in plate 1 to the vertical ports 10 which are located substantially half way between the center and outer circumferential of plate 1. The ports 10 are directed upwardly and there may be as many of them as desired. In some instances one port would be sufficient while in others, several would be desirable. However, the sum of the cross sectional areas of the ports should not exceed the cross section of the hole in the pipe 3.

The drill pipe 3 is connected at its upper end with mechanism, preferably a hand tool driven by compressed air, for rotating the same, and the hollow passage in pipe 3 is connected through valve means to the source of air pressure. At intervals the valve is opened, either manually or automatically, and compressed air is fed through the pipe 3, through passages 9 and ports 10, to the area above the plate 1.

The compressed air emitted from ports 10 has a tendency to break up the spoil and blow the finer particles from the hole. It cleans the hole very effectively. Should the hole be deep, however, larger pieces of spoil may remain in the hole, in which case the drill is pulled out part way and air again applied to blow the spoil out. The drill can then be lowered to drilling position without having to remove it completely from the hole to remove the spoil. A central lead screw 11 is preferably provided to assist in centering the drill.

The lead screw 11 is blunt and serves to engage any impenetrable object such as a water pipe or main and stop the feed of the bit, thereby indicating when the object is encountered and at the same time protecting it from the bit.

The invention is particularly applicable in the drilling of holes from three to eight or ten inches in diameter, as for posts and for piping beneath streets. The blade is relatively inexpensive and can be readily replaced. In tests the drill has been found to work best in heavy soils, but it also works well in light soils and in soft rocks. The emitting of air from ports 10 at a point directly beneath the spoil is very effective in cleaning out the hole, and the plate 1 compels the released air to move upwardly with its charge of spoil, while pressing the drill bit harder into the soil to be cut. The air passing through the plate 1 has some effect for cooling the plate.

Various embodiments of the invention in its several phases may be made within the scope of the accompanying claims.

The invention is claimed as follows:

1. A drill bit comprising a circular plate of metal of substantial thickness, cutting means secured thereon and disposed to deliver spoil on the upper side of the plate, a hollow drill stem extending upwardly from the center of the plate to rotate the same, and a passage connecting with the hollow drill stem and providing a port in the upper surface of the plate for discharging cleaning fluid for removing spoil from the hole being drilled.

2. A drill bit comprising a circular plate of metal of substantial thickness, cutting means secured thereon and disposed to deliver spoil on the upper side of the plate, a hollow drill stem extending upwardly from the center of the plate to rotate the same, a port in the upper surface of the plate located substantially midway between the outer circumference and the center, and a passage through the plate connecting the hollow drill stem with said port for transmitting compressed air to be discharged from the port.

3. A drill bit comprising a metal plate of substantially circular outer perimeter and having a central upstanding drill stem with a corresponding depending lead projection, and a cutter blade supported at an angle by said plate in an opening therein with its forward edge below the lower surface of the plate, said cutter blade extending from the drill stem to the outer edge of the plate and being offset from the center of the plate to make an angle with the radius thereof and provide for movement of the spoil radially as it passes upwardly over the blade, and said plate having an outer edge of substantial depth to provide a bearing surface against the wall of the hole being drilled to prevent lateral offsetting of the drill bit from the radial crowding of the spoil.

CHARLES W. KANDLE.